United States Patent [19]

Wang

[11] Patent Number: 4,480,074

[45] Date of Patent: Oct. 30, 1984

[54] PROCESS FOR PREPARING ELASTOPLASTIC COMPOSITIONS

[75] Inventor: Yun L. Wang, Wadsworth, Ohio

[73] Assignee: Monsanto Company, St. Louis, Mo.

[21] Appl. No.: 435,540

[22] Filed: Oct. 20, 1982

[51] Int. Cl.³ .................... C08L 23/26; C08L 23/30; C08L 23/36
[52] U.S. Cl. .................................. 525/194; 525/197; 525/211; 525/240
[58] Field of Search ................. 525/211, 240, 194

[56] References Cited

U.S. PATENT DOCUMENTS

| | | | |
|---|---|---|---|
| 3,806,558 | 4/1974 | Fischer | 525/211 |
| 4,104,210 | 8/1978 | Coran et al. | 260/4 |
| 4,130,535 | 12/1978 | Coran et al. | 260/33.6 |
| 4,141,863 | 2/1979 | Coran et al. | 260/3 |
| 4,173,566 | 11/1979 | Coran et al. | 260/30.8 |
| 4,299,931 | 11/1981 | Coran et al. | 525/95 |
| 4,311,528 | 1/1982 | Abdou-Sabet et al. | 260/33.6 |

Primary Examiner—Carman J. Seccuro
Attorney, Agent, or Firm—Larry R. Swaney

[57] ABSTRACT

A process is described for preparing elastoplastic composition which comprises dynamically vulcanizing rubber with a thermoplastic blend of cured rubber and plastic.

8 Claims, No Drawings

PROCESS FOR PREPARING ELASTOPLASTIC COMPOSITIONS

This invention relates to a process for preparing elastoplastic compositions and products prepared thereby.

BACKGROUND OF THE INVENTION

Dynamic vulcanization is a known process whereby rubber is vulcanized while it is masticated with a molten plastic. The resulting product is a blend of cured rubber particles dispersed throughout the plastic. Elastoplastic compositions are obtained which are elastomeric yet are processable as thermoplastics, provided that the concentration of rubber is high enough and the rubber particles small enough. These elastoplastic compositions can be fabricated into a variety of products by conventional procedures. for example, by extrusion, calendaring or injection or compression molding. As the proportion of rubber increases in the blend, there is a diminution of fabricability. This lack of fabricability limits the full potential for elastoplastic compositions, particularly, for compositions containing high proportions of rubber where the problem is more severe. Accordingly, there is a need for more fabricable elastoplastic compositions.

SUMMARY OF THE INVENTION

It has now been discovered that elastoplastic compositions exhibiting improved fabricability can be prepared by dynamically vulcanizing uncured polyolefin rubber with a thermoplastic composition comprising a blend of cured polyolefin rubber and polyolefin resin. In other words, a thermoplastic composition is first prepared, preferably by dynamic vulcanization. To this prepared composition, additional uncured rubber is added which rubber is then dynamically vulcanized. Another way of envisioning the invention is that a thermoplastic composition of cured polyolefin rubber and polyolefin resin is used as the reaction medium in which additional uncured monoolefin rubber is dynamically vulcanized. The resulting elastoplastic composition exhibits better fabricability than a composition containing identical proportions of components but prepared directly by a single dynamic vulcanization step.

The process of the invention comprises dynamically vulcanizing a blend comprising (a) an elastoplastic composition comprising a blend of about 25 to 50 parts, preferably 25 to 40 parts, by weight of crystalline polyolefin resin and, correspondingly, about 75 to 50 parts, preferably 75 to 60 parts by weight of vulcanized monoolefin rubber, and (b) unvulcanized but vulcanizable monoolefin rubber composition comprising monoolefin rubber in an amount so that after vulcanization the final composition (c) comprises a blend of about 15 to 45 parts by weight of crystalline polyolefin resin and, correspondingly, about 85 to 55 parts by weight of vulcanized monoolefin rubber. Typically, the amount of unvulcanized monoolefin rubber of (b) is about 10 to 70 parts, preferably 10 to 40 parts, by weight per 100 parts by weight of vulcanized monoolefin rubber of (a).

The conditions for carrying out the instant process are the same as known dynamic vulcanization processes, i.e., the blend is masticated at a temperature above the melting temperature of the plastic and at a mixing rate sufficient to disperse the rubber as small particles throughout the plastic by the time the vulcanization reaction is essentially complete. Mixing rates and temperatures vary depending upon the type of rubber, plastic, or both, type of rubber curative, or type of mixer, which variations are known to those skilled in the art or which can be readily ascertained by following the teachings of the art coupled with a few experiments. Illustrative, but not exhaustive, examples of dynamic vulcanization processes are U.S. Pat. Nos. 4,104,210; 4,130,535; 4,141,863; 4,173,556; 4,299,931; and 4,311,628. Depending upon the blend components, the temperature, curative system, type of mixer, and intensity of mixing, mixing times may be in the order of 30 seconds or less or 10 minutes or longer. Depending upon the blend components, curative system type of mixer and intensity of mixing, temperatures may vary from 150° C. or below to 250° C. or more. For most blends, temperatures will typically be between about 170° to 230° C.

The process of the invention is applicable to any vulcanizable monoolefin rubber and crystalline polyolefin resin which is compatible or compatibilizable. Examples of suitable monoolefin copolymer rubber and crystalline polyolefin resin are described in U.S. Pat. Nos. 4,130,535 and 4,311,628, the disclosures of which are incorporated herein by reference. A preferred monoolefin rubber is EPDM rubber and a preferred crystalline polyolefin resin is polypropylene.

Any rubber curative system suitable for monoolefin rubber may be used in the practice of this invention. Examples of suitable curatives are accelerated sulfur systems including efficient and semi-efficient systems, peroxide systems alone or with co-agents, phenolic resin curative systems, phenylenebismaleimide, urethane curatives, and diamine curatives. The amount of curative can be varied, but generally is that quantity required to cause sufficient number of cross-links to improve the properties of the rubber. Enough curative should be used to substantially increase the gel content of the rubber. Generally, the amount is that quantity conventionally used to obtain a technical cure.

The process of the invention may be carried out either as a batch process or as a continuous process. In a batch process, composition (a) is first prepared separately. Then enough composition (b) comprising unvulcanized monoolefin rubber, rubber curative and optionally other compounding ingredients are charged to a mixer, such as, a Banbury mixer, in the amount to give the optimum charge for the particular mixer. Dynamic vulcanization is then carried out in the conventional manner. In a continuous process, rubber, plastic and curative are charged to a mixing extruder, for example, a twin screw mixer. Dynamic vulcanization is carried out via selection of the appropriate temperature and residence time to obtain composition (a) comprising a blend of cured rubber and plastic. Downstream from the vulcanization zone, uncured rubber and rubber curative are charged to the mixer. Composition (a) and the added components are mixed in a homogenization zone and then passed through another vulcanization zone. Of course, there can be some overlap of the two zones since homogenization and vulcanization may be occurring to a certain extent at the same time.

The relative proportions of cured rubber and plastic incompositions (a) and (c) and of uncured rubber in composition (b) are not subject to absolute delineation because they can vary due to a number of factors, such as, the type of rubber and plastic, the type and amount of curative, the presence or absence of plasticizer, extender oil, pigments, carbon black, clay, etc. and the type of mixer used. The maximum amount of vulcanized rubber of composition (c) is reached when the composition is no longer processable as a thermoplastic. This amount varies from composition to composition because of the factors explained above. But this amount is readily ascertained because when it is exceeded, the product "scorches", i.e., it crumbles and no longer retains the form of a mass. In any event, the process of the invention gives more fabricable compositions than identical compositions prepared by a single dynamic vulcanization step.

PREFERRED EMBODIMENTS

To illustrate the invention, a masterbatch is prepared by mixing 50/50 oil extended EPDM rubber (200), processing oil (30), clay (37), and titanium dioxide (5) which masterbatch is designated M-1. The quantities in parentheses are all parts by weight. A series of elastoplastic compositions are prepared by dynamically vulcanizing at dump temperatures of 193±5° C. for about ten minutes in a 1-A Banbury mixer, a blend comprising M-1 masterbatch, paraffin wax, zinc oxide, heat stabilizer, stannous chloride, dimethylol-p-octylphenol curing resin SP-1045, and polypropylene Profax 6723 (PP) in the quantities (parts by weight) indicated in Table 1.

TABLE 1

|  | EP-1 | EP-2 | EP-3 | EP-4 |
| --- | --- | --- | --- | --- |
| M-1 | 272 | 272 | 272 | 272 |
| PP | 58.5 | 45 | 38.6 | 32.5 |
| ZnO | 2 | 2 | 2 | 2 |
| Wax | 5 | 5 | 5 | 5 |
| Stabilizer | 0.4 | 0.4 | 0.4 | 0.4 |
| SP-1045 | 10 | 10 | 10 | 10 |
| SnCl$_2$ (60% dispersion in oil) | 2.8 | 2.8 | 2.8 | 2.8 |

A series of elastoplastic compositions of the invention comprising the identical compositions of EP-2, EP-3 and EP-4 are prepared by dynamically vulcanizing at dump temperatures of 193±5° C. for about ten minutes in a 1-A Banbury mixer in the proportions indicated in Table 2, a blend comprising EP-1 and vulcanizable rubber composition designated V-1 comprising M-1 masterbatch (272), zinc oxide (2), wax (5), stabilizer (0.4), SP-1045 (10) and stannous chloride (2.8) (60% in oil). The properties of the compositions are shown in Table 2. The tensile properties and oil swell are determined in the same manner as described in U.S. Pat. No. 4,311,628.

Improved fabricability of compositions of the invention is illustrated by comparing the extrusion characteristics of the different materials. For example, surface appearance is the visual observation of the surface smoothness of a 4.7 mm diameter rod extruded at 210° C. Another variable studied measures the integrity of a tubing by determining its extensibility at processing temperature. A 12.7 mm O.D. tubing is prepared by extruding a composition through a 12.7 mm O.D.×9.53 mm I.D. orifice (die L/D of 20/1) by use of a 3.81 mm diameter Davis-Standard extruder equipped with 24:1 L/D general purpose screw at about 70 RPM. The take-off rate is progressively increased until a void forms in the tubing wall. Draw-down area ratio is the ratio of the die annulus area to the cross-sectional area of the tubing near the void. Higher take-off rates and larger draw-down area ratios indicate better fabricability.

TABLE 2

|  | 1 | 2 | 3 | 4 | 5 | 6 | 7 |
| --- | --- | --- | --- | --- | --- | --- | --- |
| Composition | EP-1 | EP-2 | EP-1(80) V-1(20) | EP-3 | EP-1(70) V-1(30) | EP-4 | EP-1(60) V-1(40) |
| Rubber/PP Ratio | 63/37 | 69/31 | 69/31 | 72/28 | 72/28 | 75/25 | 75/25 |
| Properties |  |  |  |  |  |  |  |
| TS, MPa | 8.8 | 7.4 | 7.5 | 7.5 | 7.0 | 4.9 | 6.9 |
| M$_{300}$, MPa | 6.5 | 6.3 | 5.7 | 6.0 | 5.8 | — | 5.9 |
| Elong., % | 410 | 350 | 390 | 340 | 370 | 270 | 350 |
| Tension Set, % | 7 | 5 | 6 | 4 | 4 | 3 | 4 |
| Shore A Hardness | 73 | 65 | 66 | 61 | 63 | 57 | 59 |
| #3 ASTM Oil Swell, % | 63 | 68 | 69 | 71 | 70 | 80 | 73 |
| Extrudability, 4.7 mm rod @ 210° C. | Smooth | Sl. rough | Smooth | Sl. rough | Smooth | Crumbles, not extrudable | Smooth |
| Area Ratio | 2.3 | 1.6 | 2.5 | 1.4 | 1.8 | — | 1.4 |
| Take Off Rate, cm./min. | 653 | 467 | 693 | 427 | 549 | — | 450 |

Samples 2, 4, and 6 are controls of elastoplastic compositions made by a single dynamic vulcanization step. Samples 3, 5, and 7 illustrative of the invention, are elastoplastic compositions made by the process of the invention wherein vulcanizable rubber composition is dynamically vulcanized in pre-prepared elastoplastic composition. The data show that the physical properties including oil swell are similar for identical compositions (as indicated by the rubber/polypropylene ratios). The data further shows that compositions of the invention give extrudates with smooth surfaces, and exhibit significantly higher draw-down area ratios and take-off rates. Sample 6, containing high proportions of rubber and made by a single dynamic vulcanization step will not extrude but crumbles, whereas, Sample 7, containing the same high proportion of rubber but prepared by the process of the invention gives a smooth extrudate and is fabricable as shown by the draw-down area ratio of 1.4.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A process for preparing an elastoplastic composition which comprises dynamically vulcanizing a blend comprising (a) an elastoplastic composition, prepared by dynamic vulcanization, comprising a blend of about 25 to 50 parts by weight of crystalline polyolefin resin and, correspondingly, about 75 to 50 parts by weight of vulcanized monoolefin copolymer rubber, and (b) unvulcanized but vulcanizable monoolefin copolymer rubber composition comprising monoolefin copolymer rubber in an amount so that after vulcanization the final composition (c) comprises a blend of about 15 to 45 parts by weight of crystalline polyolefin resin and, correspondingly, about 85 to 55 parts by weight of vulcanized monoolefin copolymer rubber.

2. The process of claim 1 in which the amount of monoolefin rubber of (b) is about 10 to 70 parts by weight per 100 parts by weight of vulcanized monoolefin rubber of (a).

3. The process of claim 2 in which (a) comprises 25 to 40 parts by weight of crystalline polyolefin resin and correspondingly, 75 to 60 parts by weight of vulcanized monoolefin rubber.

4. The process of claim 3 in which the amount of monoolefin rubber of (b) is about 10 to 40 parts by weight per 100 parts by weight of vulcanized monoolefin rubber of (a).

5. The process of claim 4 in which the monoolefin rubber of (a) and (b) is EPDM rubber.

6. The process of claim 5 in which the crystalline polyolefin resin is polypropylene.

7. The process of claim 6 in which the dynamic vulcanization temperature is about 170°-230° C.

8. The process of claim 7 in which the EPDM rubber is vulcanized with phenolic curative.

* * * * *